Sept. 23, 1958
B. M. HYMAN
2,853,315
LATERALLY ADJUSTABLE DRAWBAR FOR TRACTORS
CONTROLLED BY THE FRONT STEERING WHEELS
OF THE TRACTOR
Filed July 8, 1954
2 Sheets-Sheet 1
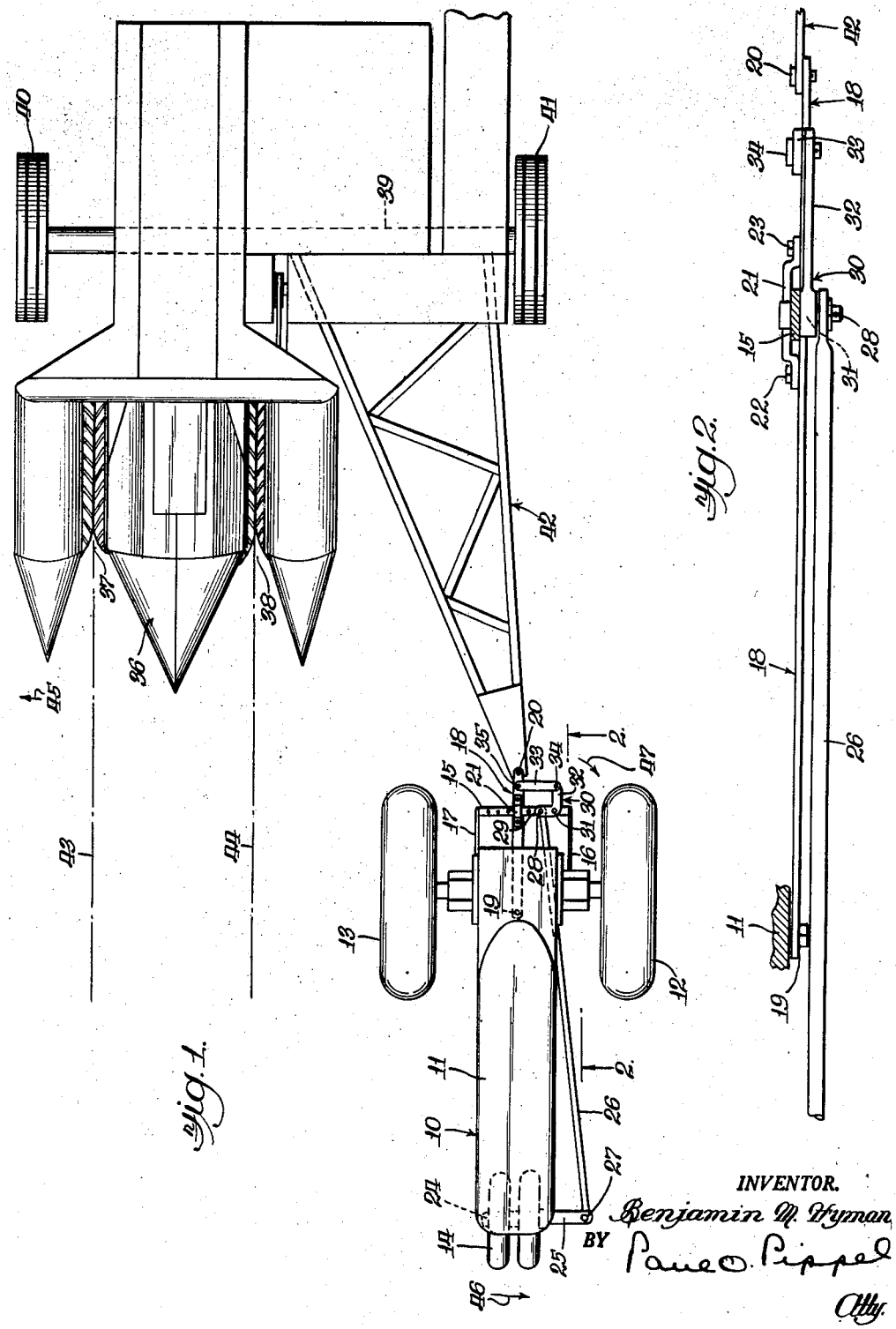
INVENTOR.
Benjamin M. Hyman
BY Paul O. Pippel
Atty.

Sept. 23, 1958

B. M. HYMAN 2,853,315

LATERALLY ADJUSTABLE DRAWBAR FOR TRACTORS
CONTROLLED BY THE FRONT STEERING WHEELS
OF THE TRACTOR

Filed July 8, 1954

Inventor,
Benjamin M. Hyman
Paul O. Pippel
Atty.

ptember. 23, 1958

United States Patent Office 2,853,315
Patented Sept. 23, 1958

2,853,315

LATERALLY ADJUSTABLE DRAWBAR FOR TRACTORS CONTROLLED BY THE FRONT STEERING WHEELS OF THE TRACTOR

Benjamin M. Hyman, East Moline, Ill., assignor to International Harvester Company, a corporation of New Jersey Application July 8, 1954, Serial No. 442,153

1 Claim. (Cl. 280—468)

This invention relates to a new and improved laterally adjustable drawbar for tractors controlled by the front steering wheels of the tractor.

Agricultural tractors are used for many purposes, some of which require the pulling of implements through fields such as cultivating or tilling the soil and/or such as harvesters wherein grain or corn that has reached maturity must be harvested. In the pulling of such implements through and over fields the tractor is equipped with what is known in the industry as a drawbar. The drawbar of a tractor is mounted at the rear thereof and permits the attachment of hitch members for trailing implements or vehicles. It is a common trait for agricultural tractors to have peculiar turning habits. In other words, when the steerable wheels of a tractor are turned in one direction the rearward portion of the tractor tends to swing in the opposite direction. This, of course, means that the drawbar at the rear of the tractor moves in a direction opposite to that of the steerable wheels. Let us analyze a hypothetical case wherein an agricultural tractor is pulling a corn harvester. Experience has shown that where an operator of the tractor gets off the row of corn which he is picking and makes an effort to get back on the row again the rear part of the tractor always initially moves in the opposite direction from which he is trying to align the implement. This then causes considerable difficulty for the operator and the greatest fault is that he knocks over several hills of corn stalks before he gets back on the row he is harvesting. All corn harvesting equipment requires that the gathering and snapping means be on the row directly in the path of the corn or there is a considerable amount of corn lost, making for inefficiency.

A principal object of this invention is to provide means for shifting the drawbar of a tractor simultaneously with and in the same direction as the front steerable wheels of the tractor are turned.

Another important object of this invention lies in the provision of means for mechanically linking the front steerable wheels of a tricycle type agricultural tractor with a shiftable drawbar at the rear of the tractor whereby the laterally shiftable drawbar moves in the same direction as the steerable wheels are turned thereupon providing for an immediate shifting of the trailing implement in the direction in which the tractor is turned.

A further important object of this invention is to equip a tractor with a laterally shiftable drawbar and means for shifting it automatically in response to the steering means of the tractor.

Still another important object of this invention is to supply a tractor with means automatically controlling the lateral adjustment of a drawbar commensurate with the degree of turning of the steerable wheels of the tractor.

A still further important object of this invention is to provide hydraulic means for laterally shifting a tractor hitch.

Another and still further important object of this invention is the provision of hydraulic means operable in response to turning of the steering means for laterally shifting a tractor hitch element.

Other and further important objects and advantages will become apparent from the disclosures in the following specification and accompanying drawings.

In the drawing:

Figure 1 is a top plan view of the tractor of this invention having the laterally adjustable drawbar thereon and shown pulling a trailing corn harvester;

Figure 2 is a sectional view of the drawbar shifting linkage taken on the line 2—2 of Figure 1;

Figure 3:
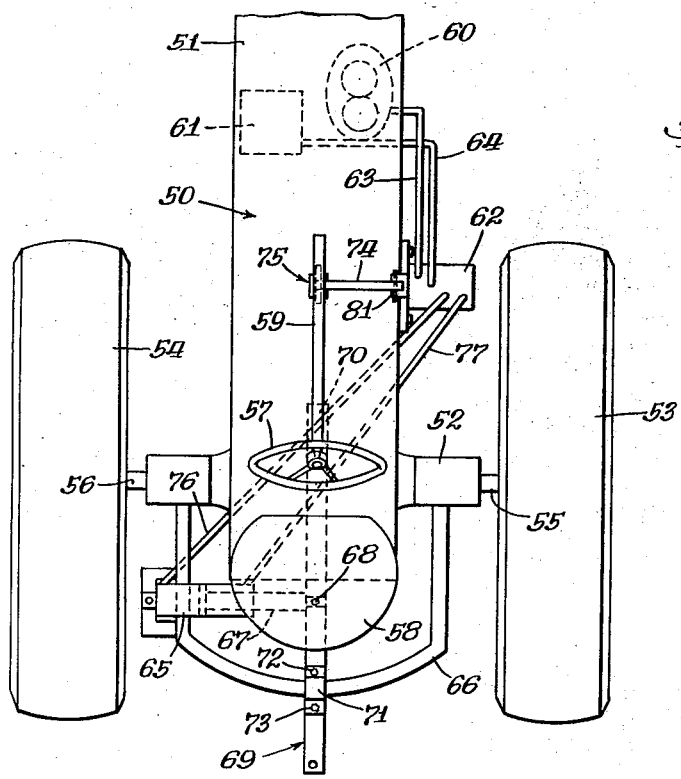
Figure 3 is a top plan view of a portion of a tractor having a modified form of the invention mounted thereon.

As shown in the drawing, the reference numeral 10 indicates generally a tricycle type agricultural tractor in which there is provided a relatively long, narrow chassis 11 supported on relatively widely spaced apart rearwardly disposed traction wheels 12 and 13 and relatively small forwardly disposed dirigible wheels 14 mounted directly beneath the forward end of the chassis 11.

The rearward portion of the tractor is provided with a transversely extending fixed drawbar 15 spaced apart from the rear of the chassis 11 on rearwardly extending fixed arms 16 and 17. A hinged drawbar 18 is pivotally mounted at 19 on the chassis 11 and extends rearwardly to a hinge point 20. Trailing implements are generally hitched to this hinge point 20 of the pulling and swinging drawbar 18 as will hereinafter be described. The swinging drawbar 18 passes beneath the stationary transversely disposed drawbar 15 and by means of a strap 21 as shown in detail in Figure 2 the pulling hinged bar 18 is given horizontal stability. The strap 21 is bolted as shown at 22 and 23 to the swinging drawbar 18 and inasmuch as the fixed drawbar 15 passes between the hinged drawbar 18 and its unitary strap 21, it is impossible for the swinging drawbar to have relative vertical movement with the fixed drawbar 15. It should be noted that the tie strap 21 is sufficiently long to permit the arcuate swinging of the swingable drawbar 18 across the surface of the straight transversely disposed stationary drawbar 15.

The dirigible wheels 14 are mounted on an axle 24 which has a lateral extension 25 extending to one side of the tractor. An elongated tie rod or connecting link 26 is hingedly mounted at 27 on the axle extension 25 at its forward end and at its rearward end the link 26 is pivotally mounted at 28 on one end 29 of a bell crank lever 30. The bell crank lever 30 is hingedly mounted on the fixed draw-bar 15 at 31. The bell crank lever 30 also has a rearwardly extending arm 32. This arm 32 of the bell crank lever is joined to the swinging drawbar 18 by means of a connecting link 33. The link 33 is hinged at 34 to the arm 32 of the bell crank lever 30 and also is hinged at its other end at 35 to the swinging drawbar 18.

In the device as shown in Figure 1 in order to illustrate the operation of the invention a pull type corn picker 36 is shown being pulled by the tractor 10 of this invention. The corn picker 36 includes spaced apart gathering units 37 and 38 to enable the machine to pick corn from adjacent rows of growing stalks and the gathering units are mounted on a relatively wide wheel truck 39 having spaced apart wheels 40 and 41. The wheel truck and thus also the corn picker 36 is provided with a forwardly and laterally outwardly extending frame structure 42 which constitutes the means for attachment to the pulling tractor. The forward portion of the frame sometimes called the A frame of the corn picker is hingedly attached at the point 20 to the swinging drawbar 18.

In the operation of the machine of this invention it is the function of the driver of the tractor to maintain the spaced apart picking units 37 and 38 on the rows 43 and 44 respectively, of growing corn. In the event these picking units 37 and 38 are not in alignment with the rows of corn, much corn will be lost in the harvesting thereof. As stated in the objects above it is an important feature of this invention to facilitate the maintenance of the corn picker on the rows of corn during the traversing of the pull type implement through the field of standing corn. Let us assume, for example, that the corn picker does get slightly off the rows 43 and 44 and the operator is desirous of returning the gathering units 37 and 38 to these rows. The operator thereupon turns the steerable wheels 14 of the tractor in the direction which would swing the steerable wheels of the tractor back toward the rows. And, contrary to the actions of all previous agricultural tractors, the drawbar 18, which is pulling the corn picker 36, directly and simultaneously moves in the same direction that the steerable wheels 14 of the tractor are turned. This results in an immediate shifting of the corn picker 36 in a "righting" direction rather than a further shifting of the corn picker into still further misalignment with the rows such as would be occasioned if the pulling drawbar were fixed. Suppose, for example, the corn picker 36 has inadvertently shifted in a direction as shown by the arrow 45 and it is the operator's job to immediately return the picker to the rows of corn 43 and 44. The operator thus turns the steerable wheels 14 of the tractor 10 in the direction as indicated by the arrow 46, thus moving the lateral extension 25 of the steerable wheel axis in a rearward direction. This movement of the extension 25 causes a concurrent rearward movement of the tie rod or connecting link 26 and a swinging of the bell crank 30 in the direction as indicated by the arrow 47 which as viewed in Figure 1 is a clockwise direction. This, of course, immediately pulls the swinging drawbar 18 and thus also the A frame 42 of the trailing implement in the same direction as indicated by the arrow 47. Thereupon the gathering units 37 and 38 immediately swing backwardly toward the rows of corn 43 and 44, thereupon minimizing the damage caused by getting off the rows initially. Conversely, when the trailing corn picker is off the row to the other side opposite the direction 45, the steerable wheels of the tractor are turned in the other direction and similarly the swingable drawbar is actuated in the other direction to thereupon compensate for the movement of the pickers off the row whereafter they are immediately returned to alignment with the rows. It should be apparent that herein is provided a means for simultaneously shifting any trailing implement in the direction in which the steerable wheels of a tractor are turned and not relying on the normal trailing of the implement to a fixed drawbar of a tractor. The swingable drawbar controlled by the steerable wheels tends to permit the operator to promptly correct row misalignment which was heretofore impossible when fixed drawbars were used.

Figure 4:
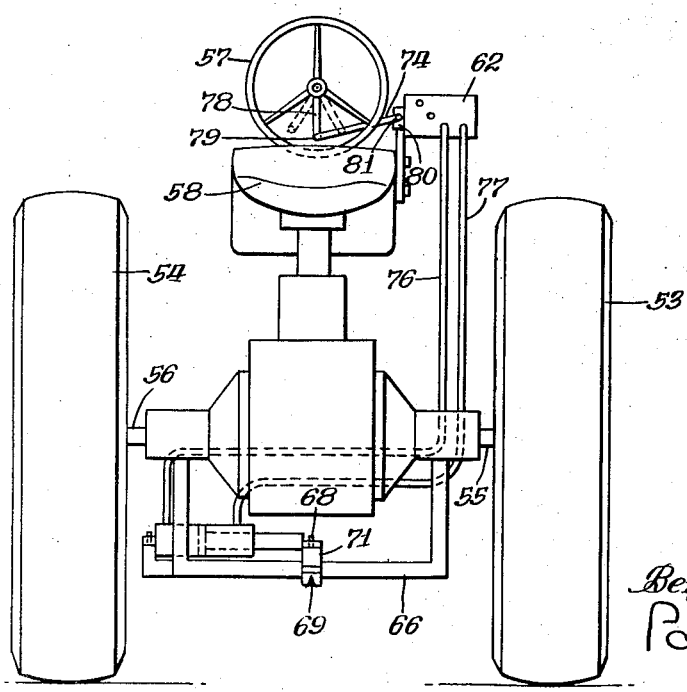
Figure 4 is an end elevational view of the tractor of Figure 3.

Figures 3 and 4 show a modified form of the invention, and relates specifically to a different means for accomplishing the shifting of the tractor hitch member. In other words, the device, as shown in Figures 1 and 2, comprises a mechanical means for effecting the lateral shifting of the drawbar hitch; whereas in the device of Figures 3 and 4, the means for effecting automatic shifting in response to steering means of the tractor is by hydraulic mechanisms. In the modification of Figures 3 and 4, the tractor is designated by the numeral 50 and is provided with a longitudinally extending narrow body or chassis 51, and has a transversely disposed axle housing 52 across the rear thereof for carrying large traction wheels 53 and 54 which are mounted respectively on axles 55 and 56. The front wheel or wheels of this tractor 50 are not shown in the drawing, although there is provided a hand-engaging steering wheel 57 which is employed to effect rotation of the steerable or dirigible wheels at the forward end of the chassis 51. The hand-engaging steering wheel 57 is located just forwardly on the tractor of the operator's seat 58. The steering wheel 57 is provided with a forwardly extending shaft 59 which by means of linkage (not shown) is interconnected with the steerable wheels (not shown) for effecting steering of those wheels.

Mounted on the tractor 50, and preferably on the chassis 51, are a hydraulic pump 60, a fluid reservoir 61, and a control valve 62. The pump 60 is driven by suitable power means (not shown) which receives fluid from the reservoir tank 61, and delivers it under pressure through a conduit 63 into the intake side of the control valve 62. A conduit 64 joins the reservoir tank 61 and the control valve 62 so that fluid may be exhausted from the tractor system and returned to the reservoir for reuse when required.

A hydraulic cylinder 65 is located at the rear of the tractor 50 on a drawbar 66. The general disposition of the hydraulic cylinder 65 is transversely with respect to the line of draft of the tractor, and is equipped with a piston 67 which extends laterally toward the center of the tractor for loose hinge engagement at 68 to a swinging hitch member 69. The switching hitch 69 is pivotally mounted on the underside of the tractor at 70 and is equipped for sliding movement on the drawbar 66 by means of a strap 71 bolted or riveted on the fore and aft sides of the swinging hitch 69 adjacent the drawbar 66 at 72 and 73, whereby the swinging hitch 69 may have lateral movement with respect to the tractor about the hinge 70 but is barred from vertical movement separately from the drawbar 66. The swinging drawbar 69 is thus comparable to the hinged drawbar 18 of the device as shown in Figure 1, and the purposes of the hinging of the drawbar 69 are the same as for the device as shown and described in Figure 1.

Here again, the swinging of the drawbar in response to the steering of the steerable wheels of the tractor minimizes the off-row position of a trailing implement. In this modification, as shown in Figures 3 and 4, the interconnection of the swinging drawbar 69 with the steering means takes the form of an attachment to the steering wheel shaft 59. A valve-operating rod 74 engages the valve 62. The lateral position of the rod 64 with respect to the valve 62 causes a particular routing of the fluid under pressure from the pump 60 either to the hydraulic cylinder 65 or by-passed to the reservoir tank 61. A member 75 provides the connection between the steering wheel shaft 59 and the valve-operating rod 74. This member 75 provides for the axial shifting of the valve-operating rod 74 in response to rotation of the steering wheel 57 of the tractor. When the steering wheel 57 is in position to correspond to a non-turned position of the front steering wheels of the tractor, then the valve 62 is so arranged in its interior to by-pass the fluid under pressure from the pump 60 to the reservoir tank 61 without directing any of the fluid to the hydraulic cylinder 65, and thus there is no shifting of the swinging drawbar 69. However, when the steering wheel is turned, there is a shifting of the valve-operating shaft 74 and a directing of the fluid under pressure to either one end or the other of the hydraulic cylinder 65. It will be seen that two conduits are provided, as shown at 76 and 77. In one position of the valve 62, fluid under pressure may be delivered through the conduit 76 to the outer end of the hydraulic cylinder 65 whereupon the piston 67 will be extended and the swinging drawbar 69 will be swung in a rightward or counterclockwise direction, as viewed in Figure 3. In this position, the fluid in the hydraulic cylinder 65 will be exhausted through the conduit 77 and thereupon returned to the reservoir tank. Now, if the steering wheel is turned in the other direction, fluid under pressure will be delivered through the hydraulic fluid line 77 and will cause a retraction of the piston 67 within the cylinder 65, causing the swinging drawbar to be swung in a clockwise direction, as viewed in Figure 3; and during such process, the fluid exhausting from the cylinder 65 will be carried through the conduit 76, back through the valve, and thence to the reservoir tank 61. As best shown in Figure 4, which is an end view of the tractor of Figure 3, the connecting member 75 includes a downwardly depending link 78 to which the connecting rod 74 is pivoted at 79. The valve 62 is more clearly shown in Figure 4 wherein there is provided a spool valve or barrel 80 to which the inner end of the connecting rod 74 is hingedly attached, as shown at 81.

In the operation of the modification of the invention as shown in Figures 3 and 4, the swinging drawbar 69 is movable in response to a turning of the steering wheel 57. Thus, when the invention is considered both as to the device of Figures 1 and 2 and the device of Figures 3 and 4, it should be understood that the swinging of the drawbar may be in response to any portion of the steering means, and this may include a direct mechanical connection between the steerable wheels or the steering wheel and/or a hydraulic connection between the steerable wheels and/or the steering wheel to effect movement of the swinging drawbar. In either event, the drawbar is swung in response to a turning of the steering wheel whereafter the trailing implement may be more easily returned to its proper line of travel, and there will be no initial further swerving out of line of this path prior to getting back on the path such as is occasioned when there is no swinging drawbar to compensate for the angular movement of the implement with respect to the pulling tractor.

It should also be understood that by reason of the existence of a shiftable drawbar, such as 18 and/or 69, the movement thereof need not be limited to movement in response to the steering means, but rather may be manually shifted by the operator either by mechanical means or by actuation of hydraulic means, such as a manual shifting of the operating arm 74 of the hydraulic control valve 62.

Numerous details of construction may be varied throughout a wide range without departing from the principles disclosed herein and I, therefore, do not propose limiting the patent granted hereon otherwise than as necessitated by the appended claim.

What is claimed is:

A tractor including steerable wheels at one end thereof, a drawbar swingably mounted on the other end of said tractor, means interconnecting the steerable wheels with the swinging drawbar whereby when the steerable wheels are turned in one direction the swingable drawbar will be turned in the same direction in an amount commensurate with the amount of movement of the steerable wheels, said means interconnecting the steerable wheels and the swingable drawbar being mechanical linkage means, said mechanical linkage comprising a bell crank lever hingedly mounted on the tractor, a link joining an arm of the bell crank lever to the swingable drawbar, said steerable wheels having a lateral extension and an elongated link joining the lateral extension of the steerable wheels to the other arm of the bell crank lever whereby when the steerable wheels are turned the swingable drawbar is simultaneously turned in the same direction.

References Cited in the file of this patent

UNITED STATES PATENTS

| | | |
|---|---|---|
| 1,485,509 | Kohler | Mar. 4, 1924 |
| 1,962,423 | Brown | June 12, 1934 |
| 2,526,282 | Sanmori | Oct. 17, 1950 |
| 2,557,471 | Romig et al. | June 19, 1951 |
| 2,600,016 | Miller | June 10, 1952 |